United States Patent
Excoffier et al.

(10) Patent No.: US 8,776,167 B2
(45) Date of Patent: Jul. 8, 2014

(54) METHOD AND SYSTEM FOR SECURE ACCESS POLICY MIGRATION

(75) Inventors: Karine Excoffier, Montbonnot (FR); Gilles Bellaton, Saint Martin (FR); Mark Craig, Barraux (FR); Ludovic Poitou, Crolles (FR)

(73) Assignee: Oracle America, Inc., Redwood Shores, CA (US)

( * ) Notice: Subject to any disclaimer, the term of this patent is extended or adjusted under 35 U.S.C. 154(b) by 1862 days.

(21) Appl. No.: 11/777,912

(22) Filed: Jul. 13, 2007

(65) Prior Publication Data

US 2009/0019515 A1 Jan. 15, 2009

(51) Int. Cl.
*H04L 29/06* (2006.01)
*G06F 7/04* (2006.01)

(52) U.S. Cl.
USPC .................................. 726/1; 726/27; 726/30

(58) Field of Classification Search
None
See application file for complete search history.

(56) References Cited

U.S. PATENT DOCUMENTS

| | | | |
|---|---|---|---|
| 7,363,650 B2 * | 4/2008 | Moriconi et al. | 726/1 |
| 7,673,323 B1 * | 3/2010 | Moriconi | 726/1 |
| 7,774,837 B2 * | 8/2010 | McAlister | 726/15 |

* cited by examiner

*Primary Examiner* — Kaveh Abrishamkar
(74) *Attorney, Agent, or Firm* — Osha Liang LLP (57) ABSTRACT

A method for deploying a directory server that includes receiving a new version of the directory server on a server to replace a prior version of the directory server, wherein the new version of the directory server uses a new version of an access policy and the prior directory server uses a prior version of the access policy, and configuring the new version of the directory server to use both the prior version of access policy and the new version of the access policy, wherein the new version of the directory server maintains compatibility between the new version of the access policy and the prior version of the access policy.

20 Claims, 5 Drawing Sheets

METHOD AND SYSTEM FOR SECURE ACCESS POLICY MIGRATION

BACKGROUND

Millions of networks use shared resources that are managed using directory servers. A directory server is a software application or a set of applications that stores, manages, administers and organizes information about network users and network resources, which may include volumes, folders, files, printers, users, groups, devices, data or any other shared resource. Typically, a directory server includes access policies that are used to control users' access to the resources.

An access policy typically includes multiple attributes that may be set to define a user's access to one or more resources. For example, attributes in an access policy may include a user identifier, a user password, a resource identifier, and an access level. When an application attempts to access a resource, the directory server evaluates the attributes associated with the user of the application to determine whether to grant the application access to the resource and the level of access the application is allowed.

Access policies may be changed when a new version of a directory service is created. These changes may include, for example, adding new attributes, combining previously separate attributes, splitting a single attribute into multiple attributes, changing the format of an attribute, and/or modifications to conform the access policy to a standard access policy. When the new version of the directory service is deployed to replace a previous version, a system administrator typically manually applies any changes that must be made to transfer the information in the attributes of the previous version of the access policy to the attributes in the new version of the access policy. Further, the previous version of the directory server continues to be used until the access policy changes are completed and tested.

SUMMARY

In general, in one aspect, the invention relates to a method for deploying a directory server that includes receiving a new version of the directory server on a server to replace a prior version of the directory server, wherein the new version of the directory server uses a new version of an access policy and the prior directory server uses a prior version of the access policy, and configuring the new version of the directory server to use both the prior version of access policy and the new version of the access policy, wherein the new version of the directory server maintains compatibility between the new version of the access policy and the prior version of the access policy.

In general, in one aspect, the invention relates to a server that includes a prior version of an access policy, a new version of the access policy; and a directory server configured to use both the new version of the access policy and the prior version of the access policy, wherein the directory server maintains compatibility between the new version of the access policy and the prior version of the access policy.

In general, in one aspect, the invention relates to a computer readable medium comprising computer code embodied therein for causing a computer system to receive a new version of a directory server on a server to replace a prior version of the directory server, wherein the new version of the directory server uses a new version of an access policy and the prior directory server uses a prior version of the access policy, and configure the new version of the directory server to use both the prior version of access policy and the new version of the access policy, wherein the new version of the directory server maintains compatibility between the new version of the access policy and the prior version of the access policy.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for deploying a new version of a directory server that uses a new version of an access policy (i.e., a new access policy). Specifically, embodiments of the invention allow for installing a new version of a directory server that may be configured to manage access to resources according to the access policy of the prior version of the directory server (i.e., the prior access policy) and the access policy of the new version of the directory server. Further, if changes are made to attribute values in the prior access policy, the values of corresponding attributes in the new access policy are automatically kept consistent (i.e., compatible) with those changes and vice versa. Once the new access policy is verified, the attribute values of the prior access policy may be removed and the new version of the directory server configured to use only the new access policy.

Figure 1:
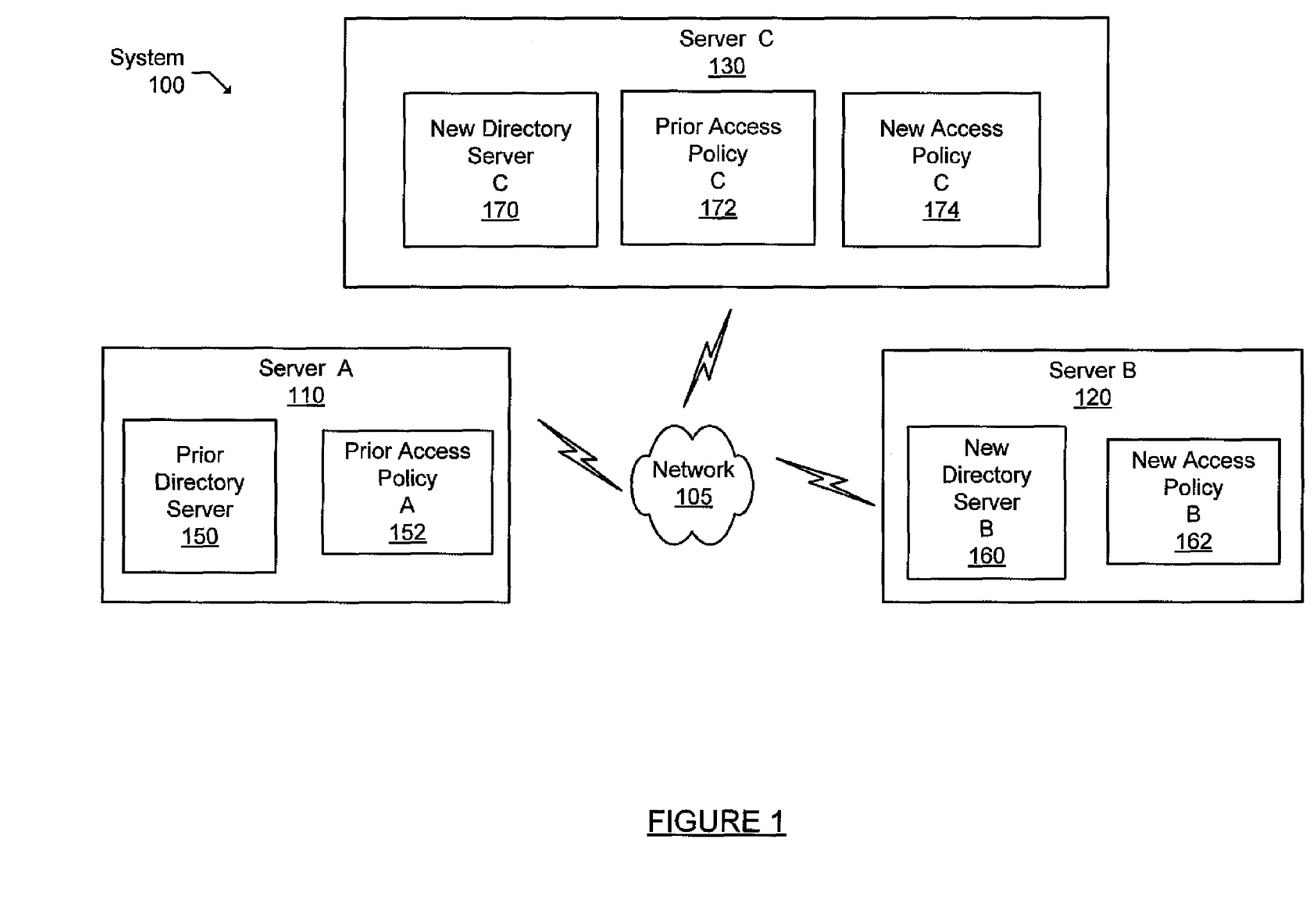
FIGS. 1 and 2 show systems in accordance with one or more embodiments of the invention.

FIG. 1 shows a system (100) in accordance with one or more embodiments of the invention. More specifically, FIG. 1 shows a system of servers in which a new version of a directory server with a new version of an access policy is being deployed. As shown in FIG. 1, the system includes servers (e.g., server A (110), server B (120), server C (130)) interconnected by a network (105). While only three servers are shown in the system of FIG. 1 for simplicity of presentation and explanation, one of ordinary skill in the art will appreciate that any number of servers may be included.

The network (105) may be a wide area network (WAN), a metropolitan area network (MAN), a local area network (LAN), a public network (such as the Internet or World Wide Web), or any combination thereof. Further, the network (105) may include one or more networks interconnected by other network types (e.g., distinct LANs connected by one or more WANs). The network (105) may also include wired segments, wireless segments, or a combination thereof.

Each server (i.e., server A (110), server B (120), server C (130)) may be a blade server, a rack-mount server, a personal computer, or any other suitable computer system. Further, a server may be a file server, a database server, a backup server, a print server, a mail servers, a web server, a file transfer protocol (FTP) server, an application server, a virtual private network (VPN) server, a dynamic host configuration protocol (DHCP) server, a domain name server, a logon server, a security server, a domain controller, a backup domain controller, a proxy server or any other server type.

A directory server (i.e., prior directory server (150), new directory server B (160), new directory server C (170)) is installed on each server (i.e., server A (110), server B (120), server C (130)). In one or more embodiments of the invention, the directory server may be a Lightweight Directory Access Protocol (LDAP) directory server. Further, each server (i.e., server A (110), server B (120), server C (130)) is in a different state of migration from a previous version of a directory server (i.e., prior directory server (150)) to a new version of the directory server (i.e., new directory server B (160), new directory server C (170)). That is, the prior directory server (150) installed on server A (110) and the new directory servers (i.e., new directory server B (160), new directory server C (170)) installed on server B (120) and server C (130) are versions of the same directory server. More specifically, the prior directory server (150) is a prior version of the new directory server (i.e., new directory server B (160), new directory server C (170)).

In one or more embodiments of the invention, the directory server (i.e., prior directory server (150), new directory server B (160), new directory server C (170)) is a server application, or set of server applications, that includes functionality to store, manage, administer and organize information about network users and/or network resources. The directory server (i.e., prior directory server (150), new directory server B (160), new directory server C (170)) may also provide essential services such as, for example, identification, authentication, and accountability.

The directory server (i.e., prior directory server (150), new directory server B (160), new directory server C (170)) also includes functionality to manage access to resources based on an access policy. More specifically, the prior version of the directory server (i.e., prior directory server (150)) implements a prior version of the access policy (i.e., prior access policy A (152)), and the new version of the directory server (i.e., new directory server B (160), new directory server C (170)) implements a new version of the access policy (i.e., new access policy B (162), new access policy C (174)). In one or more embodiments of the invention, the access policy is a password policy for an LDAP directory server.

An access policy (i.e., prior access policy A (152), new access policy B (162), prior access policy C (172), new access policy C (174)) includes a set of attributes and other information that the directory server (i.e., prior directory server (150), new directory server B (160), new directory server C (170)) uses to manage user access to resources. The attributes of an access policy (i.e., prior access policy A (152), new access policy B (162), prior access policy C (172), new access policy C (174)) may, among other things, uniquely identify users and resources in the network (105), define access levels for combinations of a user and a resource, define how an authorized user may use a resource (e.g., read, write, modify, delete, add, etc.), and specify a length of time a user is authorized to access a resource. Further, the values of attributes in an access policy (i.e., prior access policy A (152), new access policy B (162), prior access policy C (172), new access policy C (174)) may be stored in different formats such as integers, strings, characters, arrays, or any other suitable format.

The attribute values of the access policies (i.e., prior access policy A (152), new access policy B (162), prior access policy C (172), new access policy C (174)) may be stored in a repository (not shown) accessible by the directory server (i.e., prior directory server (150), new directory server B (160), new directory server C (170)) managing the access policy. The repository may be any device or medium capable of storing access policy attribute values. For example, a repository may be one or more databases, one or more flat files, a spreadsheet, an XML file, or any other suitable data repository. Further, the repository may be directly connected to the directory server or may be connected to the directory server via a network.

The new version of the directory server (i.e., new directory server B (160), new directory server C (170)) includes functionality to assist in the migration from the prior version of the access policy to the new version of the access policy. More specifically, the new version of the directory server (i.e., new directory server B (160), new directory server C (170)) includes functionality to: i) migrate attribute values from the prior version of the access policy to the new version of the access policy; ii) to use both the new version of the access policy and the prior version of the access policy concurrently; iii) to maintain compatibility between the prior version of the access policy and the new version of the access policy; and iv) to remove the attributes of the prior version of the access policy from the repository. Further, one or more embodiments of the invention, the new version of the directory server includes functionality to permit the directory server to be configured in two access policy modes: a no compatibility mode and a keep compatibility mode. In other embodiments of the invention, the new version of the directory server also includes functionality to permit the directory server to be configured in a third access policy mode: clean compatibility mode. These capabilities of the new version of the directory server (i.e., new directory server B (160), new directory server C (170)) are explained in more detail below in reference to FIG. 2.

As previously mentioned, the servers shown in FIG. 1 (i.e., server A (110), server B (120), server C (130)) are in different states of migration from the previous version of the directory server to the new version of the directory server. As shown in FIG. 1, server A (110) has not yet been migrated to the new version of the directory server. More specifically, the prior version of the directory server (i.e., prior directory server (150)) is installed on server A and the prior version of the access policy (i.e., prior access policy A (152)) is used by the prior version of the directory server to manage access to resources.

Server C (130) is in the midst of a migration from the prior version of the directory server to the new version of the directory server. More specifically, server C (130) has the new version of the directory server (i.e., new directory server C (170)) that uses the new version of the access policy (i.e., new access policy C (174)) installed. In addition, the prior version of the access policy (i.e., prior access policy C (172)) is still available in the repository. New directory server C (170) is configured to manage access to resources using either prior access policy C (172) or new access policy C (174) and to maintain compatibility between the prior and new versions of the access policy. This configuration of new directory server C (170) allows for the verification of new access policy C (174) while continuing to support applications that use the directory service on server C (130) that have not yet been changed as needed to use new access policy C (174).

Server B (120) has completed the migration process. More specifically, the new version of the directory server (i.e., new directory server B (160)) and the new version of the access policy (i.e., new access policy B (162)) are in use on server B (120). In one or more embodiments of the invention, server B (120) may have had the previous version of the directory server using the previous version of the access policy installed. In such embodiments, new directory server B (160)) on server B (120) is initially configured similar to the configuration described above for new directory server C (170). Once the migration process is complete (e.g., new access policy B (162) is tested and applications that use the directory service on server B (120) have been changed as needed to use the new version of the access policy), the prior version of the access policy is removed (i.e., cleaned) from the repository and new directory server B (160) is configured to use only new access policy B (162). In other embodiments of the invention, the prior version of the directory server with the prior version of the access policy may not have been installed on server B (120). In such embodiments, new directory server B (160) is initially configured to use only new access policy B (162).

Figure 2:
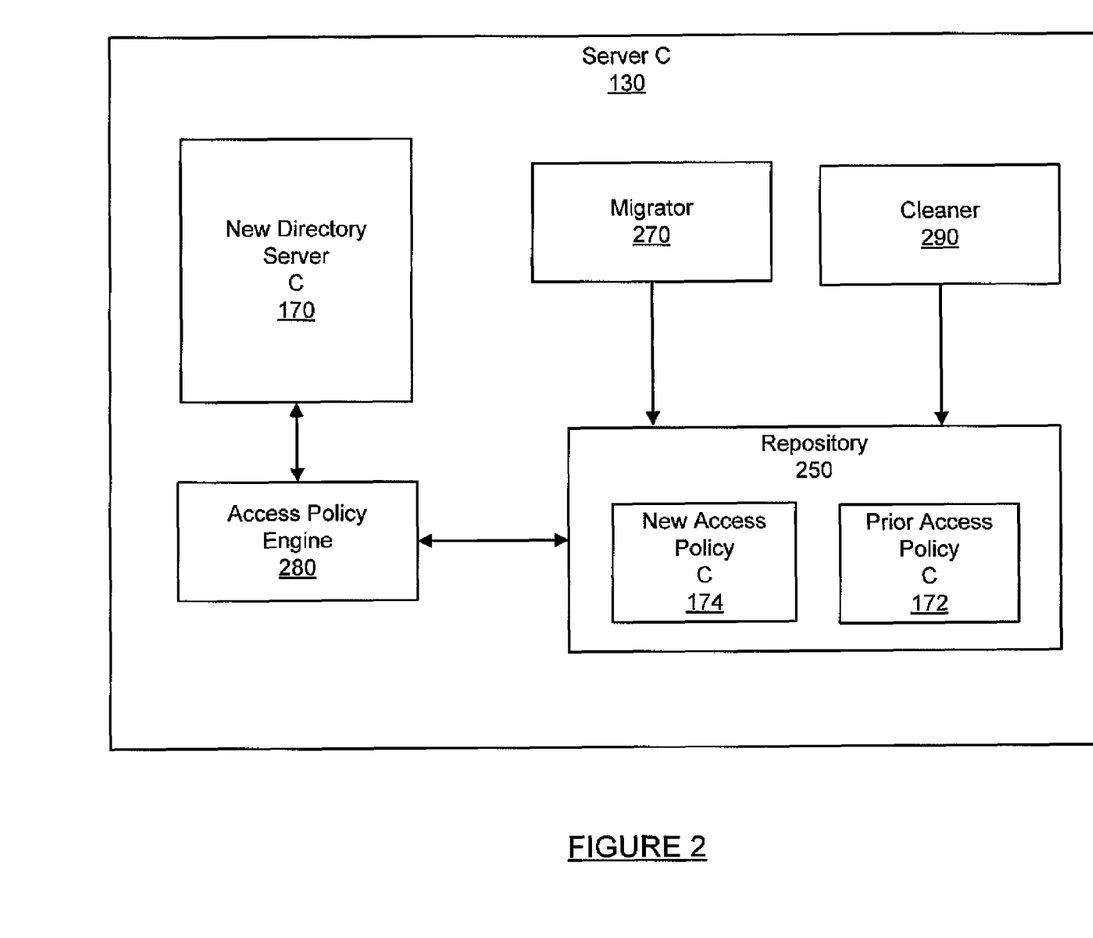

FIG. 2 shows server C (130) of FIG. 1 in more detail in accordance with one or more embodiments of the invention. As shown in FIG. 2, in addition to new directory server C (170), new access policy C (174), and prior access policy C (172), server C (130) includes an access policy engine (280), a migrator (270), a cleaner (290), and a repository (250) for storing new access policy C (174) and prior access policy C (172). Although new directory server C (170), the access policy engine (280), the migrator (270) and the cleaner (290) are shown and described as separate components, one of ordinary skill in the art will understand that any or all of the access policy engine (280), the migrator (270) and the cleaner (290) may be included in new directory server C (170).

The migrator (270) includes functionality to migrate values of attributes in prior access policy C (172) to corresponding attributes in new access policy C (174). Where there is a one to one correspondence between attributes in the prior access policy C (172) and attributes in new access policy C (174), the migrator (270) copies the values of the attributes in prior access policy C (172) to the corresponding attributes in new access policy C (174). Further, if the data type of an attribute in prior access policy C (172) differs from the data type of the corresponding attribute in new access policy C (174), the migrator (270) translates the value of the attribute in the prior access policy C (172) into the new data type of the corresponding attribute.

The migrator (270) also handles the migration of attribute values when there is not a one to one correspondence between an attribute in old access policy C (172) and new access policy C (174). If an attribute in new access policy C (174) corresponds to two or more attributes in prior access policy C (172), the migrator (270) processes the values of the two or more attributes in prior access policy C (172) to create the value of the corresponding attribute in new access policy C (174). In addition, if an attribute in new access policy C (174) does not correspond to any attribute in prior access policy C (172), the migrator (270) provides an appropriate initial value for the attribute.

In one or more embodiments of the invention, the migrator (270) may be invoked automatically when new directory server C (170) is installed on server C (130). In other embodiments of the invention, a system administrator may invoke the migrator (270) after the new directory server C (170) is installed.

The access policy engine (280) includes functionality to manage the access policy mode of new directory server C (170). More specifically, new directory server C (170) may be configured to operate in one of two access policy modes: keep compatibility mode and no compatibility mode. In keep compatibility mode, new directory server C (170) uses both new access policy C (174) and prior access policy C (172). Furthermore, when new directory server C (170) is in keep compatibility mode, compatibility is maintained between new access policy C (174) and prior access policy C (172). In no compatibility mode, new directory server C (170) uses only new access policy C (174). In one or more embodiments of the invention, new directory server C (170) may also be configured to operate in a third access policy mode: clean compatibility mode. In clean compatibility mode, new directory server C (170) may use both new access policy C (174) and prior access policy C (172). However, users of the service may access only new access policy C (174). Only the directory server itself continues to access prior access policy C (172), in order to maintain an access policy coherent with, for example, directory servers that have not yet been upgraded to support the new access policy (e.g., prior directory server (150) using prior access policy A (152) on Server A (110) as shown in FIG. 1).

Accordingly, the functionality to manage the access policy mode of new directory server C (170) in access policy engine (280) includes functionality to configure new directory server C (170) (i.e., configuration functionality) in an access policy mode and to maintain compatibility between prior access policy C (172) and new access policy C (174) (i.e., compatibility functionality). The configuration functionality includes functionality to receive an indication from a system administrator to configure new directory server C (170) in a particular access policy mode. In some embodiments of the invention, the configuration functionality also enforces an ordering of the access policy modes. More specifically, once new directory server C (170) is in keep compatibility mode, the access policy mode may only be changed to either clean compatibility mode or no compatibility mode. In addition, once new directory server C (170) is in clean compatibility mode, the access policy mode may only be changed to no compatibility mode. Furthermore, once new directory server C (170) is changed from one access policy mode to another, new directory server C (170) may not be returned to any previous mode.

The compatibility functionality, operable when new directory server C (170) is in keep compatibility mode, ensures that any modification made to new access policy C (174) is appropriately applied to prior access policy C (172) and vice versa. More specifically, for those attributes in new access policy C (174) having a one to one correspondence with attributes in prior access policy C (172), when a value of such an attribute is changed in one of the access policies, the compatibility functionality changes the value of the corresponding attribute in the other access policy. In addition, if the data type of the modified attribute differs from the data type of the corresponding attribute, the compatibility functionality translates the value into the data type of the corresponding value.

Furthermore, if an attribute in new access policy C (174) corresponds to two or more attributes in prior access policy C (172), when the value of the attribute in new access policy C (174) is changed, the compatibility functionality processes the changed value to create appropriate new values for the corresponding two or more attributes in prior access policy C (172). In addition, when a value of any of the attributes in prior access policy C (172) that correspond to the attribute in new access policy C (174), the compatibility functionality process the changed value along with the other values of the attributes in prior access policy C (172) to create the value of the corresponding attribute in new access policy C (174). The compatibility functionality performs similar operations if an attribute in prior access policy C (172) corresponds to two or more attributes in new access policy C (174). The compatibility functionality also deletes attributes from an access policy when corresponding attributes in the other access policy are deleted and adds attributes to an access policy when corresponding attributes are added to the other access policy.

The cleaner (290) includes functionality to remove prior access policy C (172) from the repository (250). More specifically, the cleaner (290) removes the attribute values of prior access policy C (172) from the repository (250). In one or more embodiments of the invention, the cleaner (290) also includes functionality to remove the migrator (270), the access policy engine (280), and the cleaner (290) from the server C (130) and to reconfigure new directory server C (170) as needed in response to the removal of these components. In one or more embodiments of the invention, the cleaner (290) may be invoked automatically when new directory server C (170) is moved from clean compatibility mode to no compatibility mode. In other embodiments of the invention, the cleaner (290) may be invoked by the system administrator after new directory C (170) is moved from either clean compatibility mode or keep compatibility mode to no compatibility mode. In yet other embodiments of the invention, the cleaner (290) may include functionality to change the access policy mode of new directory server C (170) to no compatibility mode. In such embodiments, the system administrator may invoke the cleaner (290) when new directory server C (170) is either in keep compatibility mode or clean compatibility mode. After removing prior access policy C (172), the cleaner (290) then moves new directory server C (170) to no compatibility mode.

Figure 3:
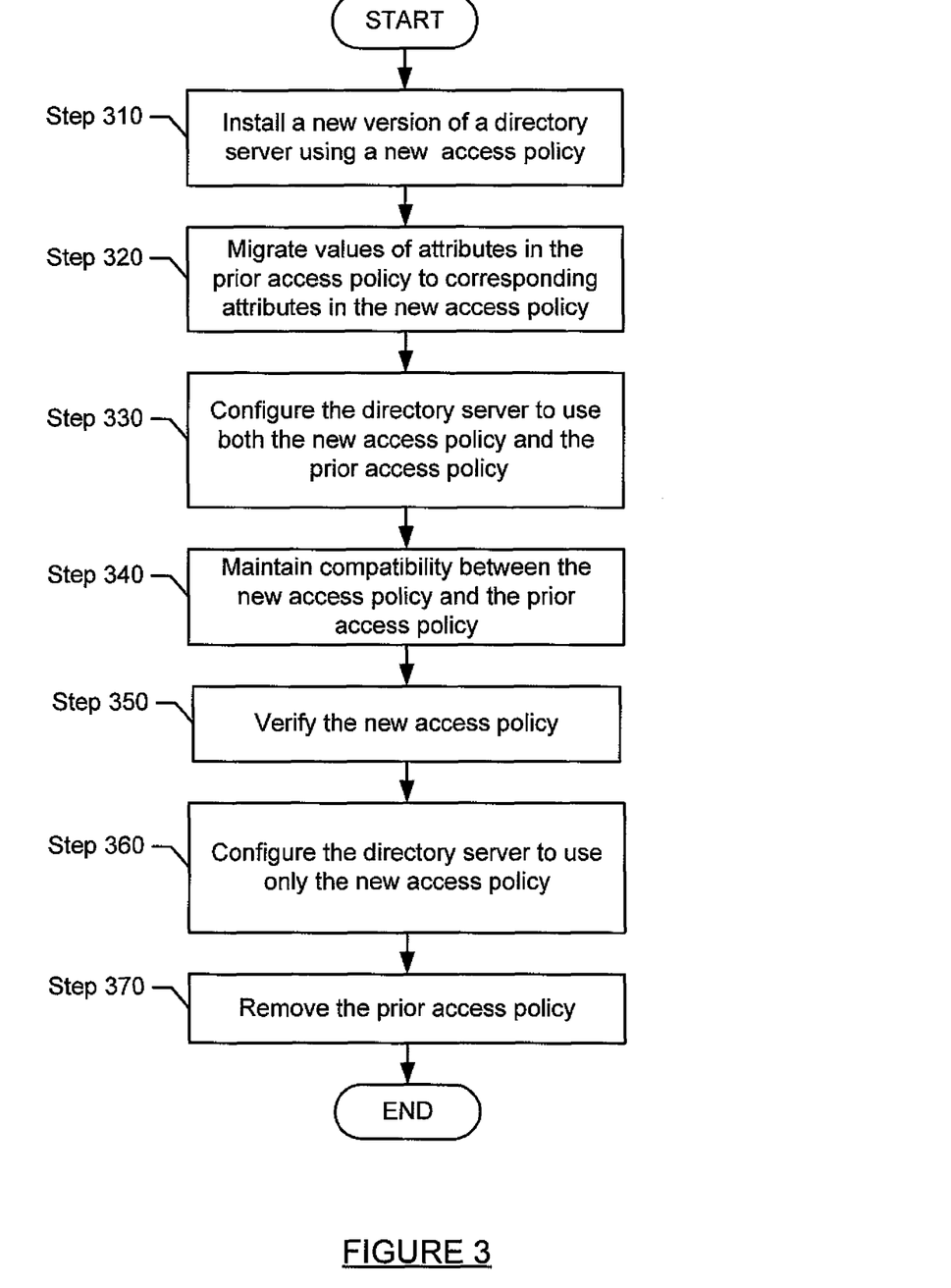
FIG. 3 shows a flowchart of a method in accordance with one or more embodiments of the invention.

FIG. 3 shows a flowchart of a method for deploying a new version of a directory server with a new version of an access policy in accordance with one or more embodiments of the invention. In some embodiments of the invention, one or more of the steps shown in FIG. 3 may be omitted, repeated, performed in a different order, and/or performed concurrently. Accordingly, the specific arrangement of steps shown should not be construed as limiting the scope of the invention.

Initially, a new version of a directory server that uses a new version of an access policy (i.e., a new access policy) is installed on a server where a previous version of the directory server using a previous version of the access policy (i.e., the prior access policy) was in use (Step 310). During the installation process, values of attributes in the prior access policy are automatically migrated to corresponding attributes in the new access policy to initialize the new access policy (Step 320). Furthermore, the prior access policy remains usable. That is, the migration process does not operate in such a way as to disable the prior access policy. In one or more embodiments of the invention, a migrator included with the new version of the directory server is executed to perform the migration.

After the migration process, the new directory server is configured to use both the new access policy and the prior access policy (Step 330). More specifically, the new directory server is configured to handle requests from applications using the new access policy and requests from applications using the prior access policy. For example, if an application using the prior access policy sends a request to the new directory server to access a resource, the new directory server processes the request in accordance with the prior access policy. And, if an application using the new access policy sends a request to the new directory server to access the same resource, the new directory server processes the request in accordance with the new access policy.

Furthermore, the new directory server manages the attributes of the prior access policy in accordance with the prior access policy and manages the attributes of the new access policy in accordance with the new access policy. For example, if the prior access policy is configured to provide a date after which the password expires, and the new access policy allows the expiration date to be configured directly, the new directory server enforces these manifestations of each access policy. In one or more embodiments of the invention, a system administrator configures the directory server to use both access policies by specifying that the directory server is to operate in keep compatibility mode.

While the directory server is configured to use both access policies, compatibility is maintained between the new access policy and the old access policy (Step 340). More specifically, modifications, additions, and deletions of attribute values made for one access policy are automatically applied, as appropriate, to corresponding attributes in the other access policy. In one or more embodiments of the invention, an access policy engine included with the directory server maintains the compatibility between the access policies.

While the directory server is configured to use both access policies, the new access policy is verified (Step 350). The verification of the new access policy may include testing the new access policy to ensure that attribute values of the prior access policy have been correctly migrated to the corresponding attributes of the new access policy, modifying applications that access the directory server to use the new access policy rather than the old access policy and testing the modifications using the new access policy, and/or performing other operations that may verify that the new access policy is correctly implemented.

After the new access policy is verified, the new directory server is configured to use only the new access policy (Step 360). In one or more embodiments of the invention, a system administrator configures the directory server to use only the new access policy by specifying that the directory server is to operate in no compatibility mode. In addition, the prior access policy is removed (Step 370). More specifically, the attributes of the prior access policy are deleted from the repository, leaving only the attributes of the new access policy. In one or more embodiments of the invention, the removal of the prior access policy is performed by a cleaner included in the new directory server.

In some embodiments of the invention, after the verification is complete, the directory server may be configured to use both access policies while no longer maintaining external access to the prior access policy. This configuration may be used, for example, to keep the prior access policy available for a time period in case a problem arises with the new access policy. This configuration is also used to move the new directory server to an operational state optimized to use the new access policy even though other directory servers in the network have not yet been upgraded to the new version with the new access policy. However, at some point in time, at the discretion of the system administrator, the new directory server is configured to use only the new access policy. In one or more embodiments of the invention, a system administrator configures the directory server to use both access policies but not maintain external access to the prior access policy by specifying that the directory server is to operate in clean compatibility mode.

Figure 4:
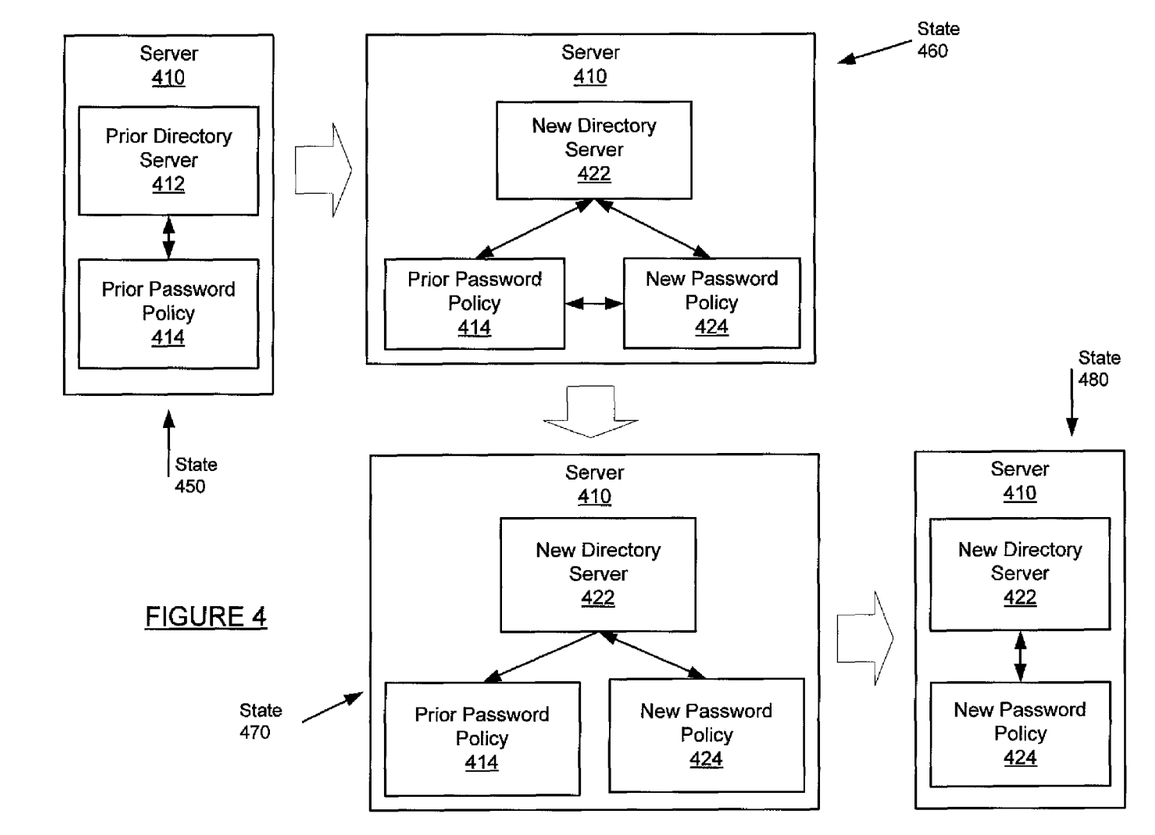
FIG. 4 shows an example in accordance with one or more embodiments of the invention.

FIG. 4 shows an example of a migration from a prior version of a directory server using a prior version of an access policy to a new version of the directory server using a new version of the access policy in accordance with one or more embodiments of the system. In the example of FIG. 4, the access policy is a password policy. Initially, the prior version of the directory server (i.e., prior directory server (412)) is installed on a server (410) and uses the prior version of the password policy (i.e., prior password policy (414)) (State 450). A system administrator starts the migration by installing the new version of the directory server (i.e., new directory server (422)) on the server (410) to replace the prior directory server (412) (State 460). The system administrator also configures the new directory server (422) to operate in keep compatibility mode, i.e., to use both the prior password policy (414) and the new password policy (424) and to maintain compatibility between the two password policies (State 460).

While the directory server is in keep compatibility mode, the system administrator may verify the new password policy (424). Once the system administrator determines that sufficient verification has been performed, the system administrator then configures the new directory server (422) to operate in clean compatibility mode, i.e., to use both the prior password policy (414) and the new password policy (424) but to no longer maintain external access to the prior access policy (State 470). Finally, once the system administrator determines that the new password policy (424) has been used for a sufficient period of time without error, the system administrator then configures the new directory server (422) to operate in no compatibility mode, i.e., to use only the new password policy (424) (State 480).

In one or more embodiments of the invention, a new version of a directory server using a new version of an access policy may be deployed to replace a prior version of the directory server that uses a prior version of the access policy without requiring that applications using the prior version of the directory server be modified to use the new version of the access policy prior to the deployment. More specifically, the new version of the directory server may be deployed and configured to use both new versions of the access policy. Applications accessing the directory server may continue to use the prior version of the access policy while any necessary modifications needed to use the new version of the access policy are made in the applications. Further, as each application is modified, the modified versions of the application may be tested using the new version of the access policy while the prior version of the application remains available to users.

Figure 5:
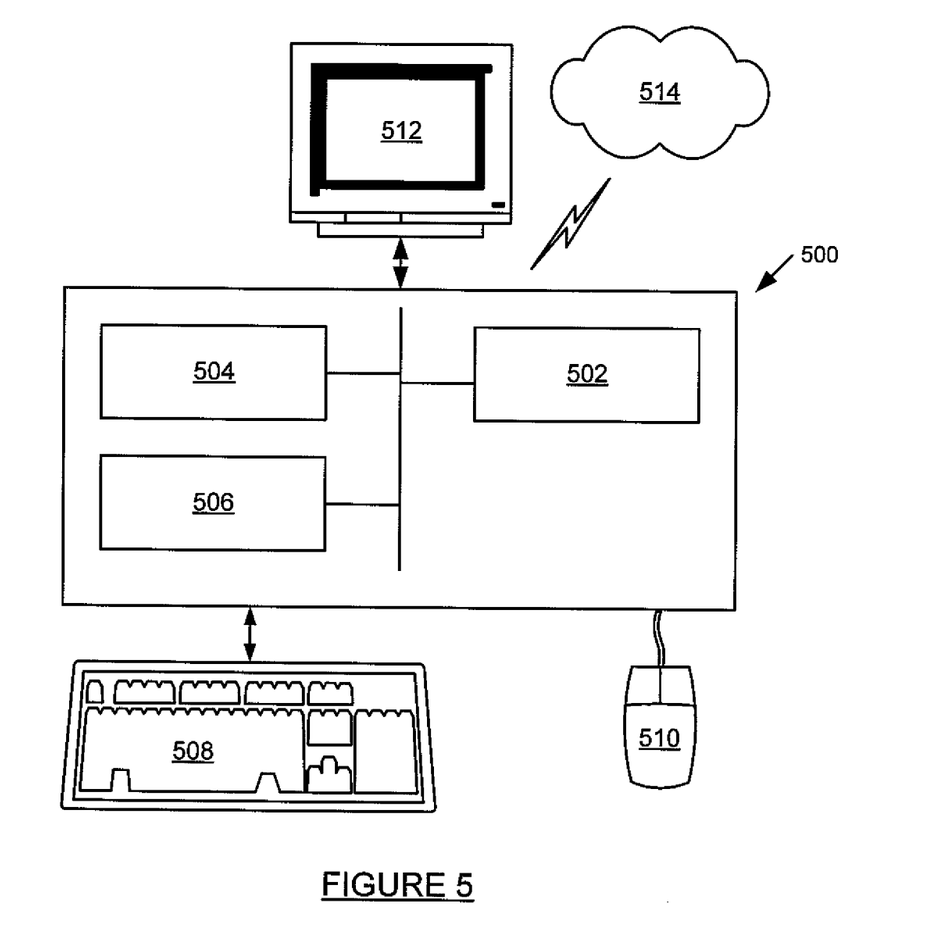
FIG. 5 shows a computer system in accordance with one or more embodiments of the invention.

Embodiments of the invention may be implemented on virtually any type of computer regardless of the platform being used. For example, as shown in FIG. 5 a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a LAN or a WAN (e.g., the Internet) (514) via a network interface connection. Those skilled in the art will appreciate that these input and output means may take other forms.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node may be a computer system. Alternatively, the node may be a processor with associated physical memory. The node may alternatively be a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for deploying a directory server application comprising:

receiving, by a prior version of the directory server application, a first request to access a resource, wherein the first request uses a prior version of an access policy;

processing, by the prior version of the directory server application, the first request using the prior version of the access policy to determine whether to grant access to the resource;

receiving, after processing the first request, a new version of the directory server application on a server to replace the prior version of the directory server application, wherein the new version of the directory server application uses a new version of the access policy and the prior directory server application uses the prior version of the access policy;

installing, by a computer processor, the new version of the directory server application on the server, wherein the installing replaces the prior version of the directory server application with the new version of the directory server application;

configuring, by the computer processor, the new version of the directory server application to concurrently use both the prior version of access policy and the new version of the access policy;

receiving, by the new version of the directory server application, a second request to access the resource; and processing, by the new version of the directory server application, the second request using at least one selected from a group consisting of the new version of the access policy and the prior version of the access policy to determine whether to grant access to the resource, wherein the new version of the directory server application maintains compatibility between the new version of the access policy and the prior version of the access policy.

2. The method of claim 1, further comprising:

migrating values of a plurality of attributes comprised in the prior version of the access policy to corresponding attributes comprised in the new version of the access policy.

3. The method of claim 1, further comprising:

verifying the new version of the access policy.

4. The method of claim 1, further comprising:

configuring the new version of the directory server application to use only the new version of the access policy.

5. The method of claim 4, wherein configuring the new version of the directory server application to use only the new version of the access policy further comprises:

removing the prior version of the access policy.

6. The method of claim 1, wherein the new version of the directory server application maintains compatibility by applying modifications made to attributes of the prior version of the access policy to corresponding attributes in the new version of the access policy.

7. The method of claim 1, wherein the new version of the directory server application maintains compatibility by applying modifications made to attributes of the new version of the access policy to corresponding attributes in the prior version of the access policy.

8. The method of claim 1, wherein, when configured to concurrently use both the prior version of access policy and the new version of the access policy, the new version of the directory server application no longer maintains external access to the prior version of the access policy.

9. A server comprising:
a computer processor;
a prior version of an access policy;
a new version of the access policy; and
a new version of a directory server application, executing on the computer processor, configured to concurrently use both the new version of the access policy and the prior version of the access policy, wherein concurrently using both the new version of the access policy and the prior version of the access policy comprises:
receiving a request to access a resource; and
processing the request using at least one selected from a group consisting of the new version of the access policy and the prior version of the access policy to determine whether to grant access to the resource,
wherein the new version of the directory server application maintains compatibility between the new version of the access policy and the prior version of the access policy,
wherein the new version of the directory server application replaces a prior version of the directory server application after the new version of the directory server application is received by the server, wherein the prior version of the directory server application uses the prior version of the access policy.

10. The server of claim 9, further comprising:
a migrator configured to migrate values of a plurality of attributes comprised in the prior version of the access policy to corresponding attributes comprised in the new version of the access policy.

11. The server of claim 9, wherein the new version of the directory server application maintains compatibility by applying modifications made to attributes of the prior version of the access policy to corresponding attributes in the new version of the access policy.

12. The server of claim 9, wherein the directory server application maintains compatibility by applying modifications made to attributes of the new version of the access policy to corresponding attributes in the prior version of the access policy.

13. The server of claim 9, further comprising:
a cleaner configured to remove the prior version of the access policy.

14. A non-transitory computer readable medium comprising computer code embodied therein for causing a computer system to:
receive a new version of a directory server application on a server to replace a prior version of the directory server application,
wherein the new version of the directory server application uses a new version of an access policy and the prior directory server application uses a prior version of the access policy;
install the new version of the directory server application on the server, wherein the installing replaces the prior version of the directory server application with the new version of the directory server application;
configure the new version of the directory server application to concurrently use both the prior version of access policy and the new version of the access policy, wherein concurrently using both the new version of the access policy and the prior version of the access policy comprises:
receiving a request to access a resource; and
processing the request using at least one selected from a group consisting of the new version of the access policy and the prior version of the access policy to determine whether to grant access to the resource,
wherein the new version of the directory server application maintains compatibility between the new version of the access policy and the prior version of the access policy.

15. The non-transitory computer readable medium of claim 14, wherein the computer code further causes the computer system to:
migrate values of a plurality of attributes comprised in the prior version of the access policy to corresponding attributes comprised in the new version of the access policy.

16. The non-transitory computer readable medium of claim 14, wherein the computer code further causes the computer system to:
configure the new version of the directory server application to use only the new version of the access policy.

17. The non-transitory computer readable medium of claim 16, wherein the computer code to configure the new version of the directory server application to use only the new version of the access policy further causes the computer system to:
remove the prior version of the access policy.

18. The non-transitory computer readable medium of claim 14, wherein the new version of the directory server application maintains compatibility by applying modifications made to attributes of the prior version of the access policy to corresponding attributes in the new version of the access policy.

19. The non-transitory computer readable medium of claim 14, wherein the new version of the directory server application maintains compatibility by applying modifications made to attributes of the new version of the access policy to corresponding attributes in the prior version of the access policy.

20. The non-transitory computer readable medium of claim 14, wherein, when configured to concurrently use both the prior version of access policy and the new version of the access policy, the new version of the directory server application no longer maintains external access to the prior version of the access policy.

* * * * *